Jan. 14, 1936.  W. G. KÖGEL ET AL  2,027,779
REFRIGERATION
Filed June 12, 1934  2 Sheets-Sheet 2

INVENTORS.
Wilhelm Georg Kögel
Nils Widell
BY
J. E. Heath
ATTORNEY.

Patented Jan. 14, 1936

2,027,779

UNITED STATES PATENT OFFICE 2,027,779

REFRIGERATION

Wilhelm Georg Kögel and Nils Widell, Stockholm, Sweden, assignors, by mesne assignments, to Servel, Inc., Dover, Del., a corporation of Delaware Application June 12, 1934, Serial No. 730,275
In Germany June 13, 1933

7 Claims. (Cl. 62—119.5)

Our invention relates to refrigeration and more particularly to absorption refrigeration systems containing an auxiliary pressure equalizing fluid.

It is an object of our invention to provide an improved refrigeration system of the absorption type having increased efficiency due to lower heat losses from the system.

An absorption refrigeration system includes as essential elements, a generator, a condenser, an evaporator, and an absorber. In accordance with our invention, unevaporated liquid is conducted from the evaporator in thermal exchange relation first with fluid flowing to the evaporator and then with vapors formed in the generator, but the unevaporated liquid is excluded from the absorber. Thus, in a pressure equalized system, the unevaporated liquid may cool first the auxiliary gas flowing to the evaporator and then the generated vapors, without creating a heat of solution loss in the absorber.

Figure 1:
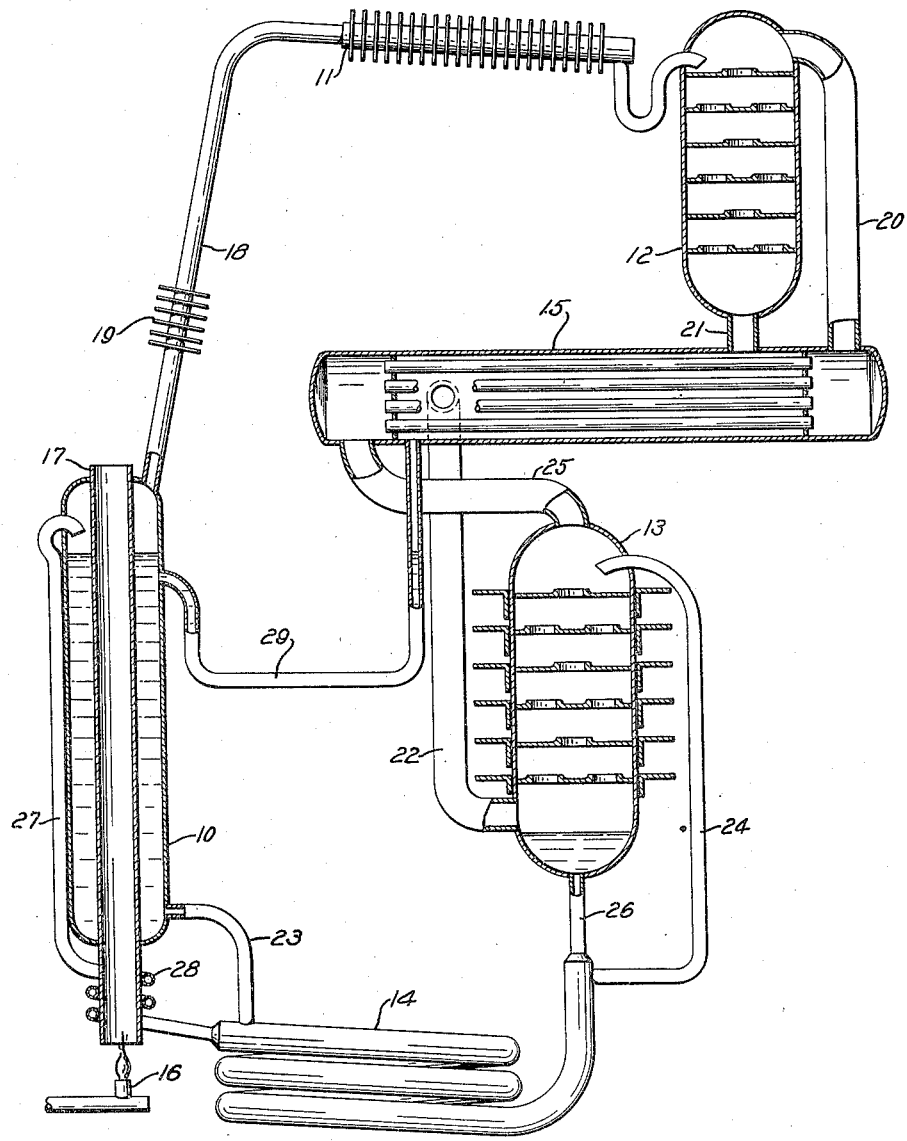
Figure 2:
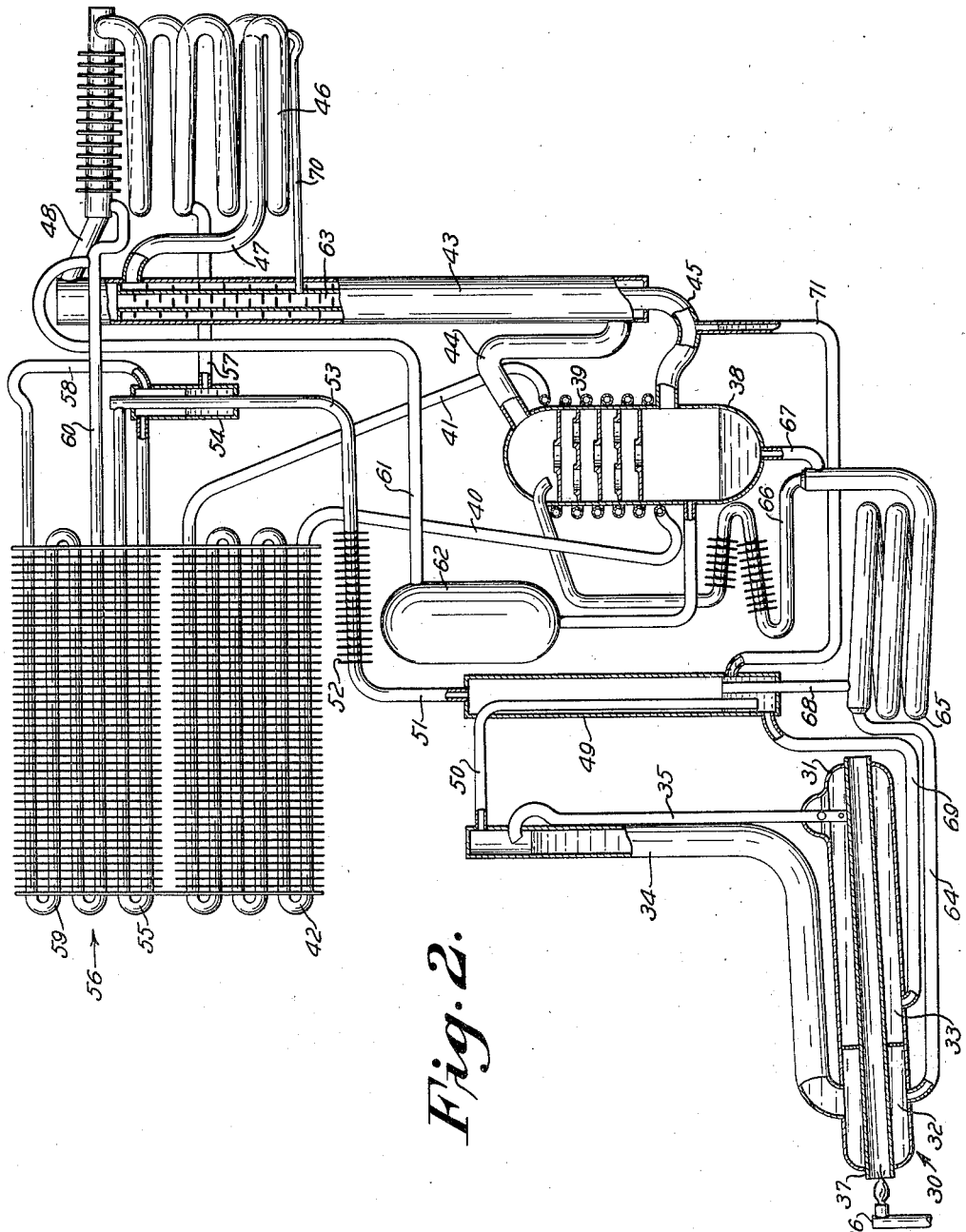

Our invention, together with the objects and advantages thereof, will be more fully understood from consideration of the following description and accompanying drawings, forming part of this specification, and of which:

Fig. 1 shows more or less schematically an absorption refrigeration system embodying our invention; and Fig. 2 is a similar view illustrating the embodiment of our invention in a modified refrigeration system of the same general type.

Referring first to Fig. 1 of the drawings, the refrigeration system includes a generator 10, a condenser 11, an evaporator 12, and an absorber 13. The generator 10 and the absorber 13 are interconnected through a liquid heat exchanger 14 for circulation of absorption liquid. The absorber 13 and the evaporator 12 are interconnected through a gas heat exchanger 15 for circulation of an inert pressure equalizing gas. The generator 10 is heated by any suitable means such as the gas burner 16 so arranged that the burner flame is projected into the lower end of a heating flue 17 which extends vertically through the generator. The condenser 11 and the absorber 13 are shown provided with heat radiation fins for air cooling, although it will be understood that these parts may be cooled in any suitable manner. The system is charged with a suitable solution of refrigerant in an absorption liquid, such as a water solution of ammonia, and an inert pressure equalizing gas such as hydrogen. These fluids are admitted into the system through a charging plug, not shown, usually provided on the absorber 13. The hydrogen is introduced at a pressure corresponding to the condensing pressure of ammonia at a predetermined temperature which, in the case of air cooling, is preferably a high room temperature.

In operation, ammonia vapor is expelled from solution in the generator 10 by heating and flows through conduit 18 to the condenser 11. In the latter, the ammonia is condensed to liquid which drains into the upper part of the evaporator 12. Conduit 18 is shown provided with heat radiation fins 19 for rectification of the expelled ammonia vapor, that is, to lower the temperature of the vapor sufficiently for condensation of entrained water vapor which then drains back through conduit 18 to the generator 10. In the evaporator 12, the liquid ammonia evaporates and diffuses into the hydrogen which enters the upper part of the evaporator through conduit 20. The resulting gas mixture flows from the lower end of the evaporator through conduit 21, the gas heat exchanger 15, and conduit 22 to the lower part of the absorber 13. Weak absorption solution flows from the lower part of the generator 10 through conduit 23, the liquid heat exchanger 14, and conduit 24 into the upper part of the absorber 13. In the absorber, ammonia vapor is absorbed into the weak absorption solution. The hydrogen or "weak gas" returns from the upper part of the absorber 13 through conduit 25, the gas heat exchanger 15, and conduit 20 to the evaporator 12. The enriched absorption solution flows from the lower part of the absorber 13 through conduit 26, the liquid heat exchanger 14, and conduit 27 to the upper part of the generator 10. The rising conduit 27 is formed as a thermosyphon conduit and has its lower portion 28 coiled in thermal conductive relation around the lower end of the generator heating flue 17, whereby solution is raised from a lower level in the absorber 13 to a higher level in the generator 10 by thermosyphonic action, as well known in the art. For a more detailed description and explanation of this type of refrigerating system, reference may be had to Patent No. 1,609,334 to Von Platen, et al.

In the above described system, the hydrogen or weak gas flowing from the absorber 13 to the evaporator 12 is cooled in the gas heat exchanger 15 by transfer of heat to the cooler gas mixture or "rich gas" flowing from the evaporator to the absorber. It is desirable that the weak gas enter the evaporator 12 at as low a temperature as possible, and a further cooling of this gas is obtained by draining unevaporated liquid from the evaporator 12 through a conduit 21 into the gas heat exchanger 15. In the latter, further evaporation of this liquid takes place, the heat of vaporization being supplied by the weak gas, and the resulting vapor diffuses into the rich gas.

It will be understood that heat losses in the rectifier and condenser may be decreased by decreasing the quantity of water vapor entrained by the ammonia vapor expelled from solution in the generator 10. It is therefore important to increase the analyzation of vapor expelled in the generator. In the above described system in which the generator 10 is of the vertical type, a certain analyzation of the vapor bubbles rising in the column of solution is effected as the vapor bubbles pass through the increasingly strong solution toward the top of the column. We have found that this analyzation of the generator vapors is increased by cooling and increasing the ammonia concentration at the upper part of the liquid column in the generator.

In accordance with our invention we accomplish the above described cooling of weak gas by evaporation of liquid ammonia, and greater analyzation of generator vapors by providing a conduit 29 from the gas heat exchanger 15 to the upper part of the generator 10. The conduit 29 is formed with a downward loop to provide a liquid trap, and functions as a drain for unevaporated liquid from the gas heat exchanger 15 to the upper part of the generator 10. Thus, unevaporated liquid from the evaporator 12 flows through conduit 21 into the gas heat exchanger 15 where it cools the weak gas as previously described and then flows through conduit 29 into the upper part of the liquid column in the generator, thereby increasing analyzation of vapor in the latter as previously set forth. In this arrangement, unevaporated liquid is conducted to the generator independently of the absorber, thereby obviating a heat loss representing the heat of solution that would have to be carried off by the absorber cooling system if the liquid were admitted into the absorber.

Referring now to Fig. 2 of the drawings, the refrigeration system illustrated functions in accordance with the same general principles as those which apply to the system described in connection with Fig. 1. In the present modification, however, the generator 30 is of the so-called horizontal type and comprises a horizontal vessel 31 divided by a partition into a weak liquid chamber 32 and a strong liquid chamber 33. The lower end of a standpipe 34 communicates with the weak liquid chamber 32, and a thermosyphon 35 is arranged with the lower end in the strong liquid chamber 33 and the upper end connected to the upper end of the standpipe 34. The generator 30 may be heated by any suitable means such as a gas burner 36 arranged so that the burner flame projects into one end of a heating flue 37 which extends substantially horizontally through the generator vessel 31.

The absorber 38 is cooled by a condensation-evaporation element comprising a cooling coil 39 in thermal transfer relation with the absorber and connected by conduits 40 and 41 to an air cooled condenser 42. This cooling element is charged with a suitable fluid such as methyl chloride which evaporates in the coil 39 and condenses in the condenser 42. In this modification, the gas heat exchanger 43 is arranged vertically, the lower end being connected to the absorber 38 by conduits 44 and 45, and the upper end being connected to a coil type evaporator 46 by conduits 47 and 48, thus maintaining substantially vertical columns of gas, one column in the downward path of flow to the absorber, and the other column in the upward path of flow to the evaporator. There is also provided an analyzer 49 in which vapor from the generator is bubbled through a column of rich absorption solution in the path of flow of the latter from the absorber to the generator as hereinafter described.

For a complete description of this system and operation thereof, reference may be had to an application of A. R. Thomas, Serial No. 673,815. Briefly, however, vapor expelled from solution in the generator flows from the upper end of the generator standpipe 34 through conduit 50 which extends downwardly in the analyzer vessel 49, terminating in the lower part thereof. In the analyzer 49, the vapor bubbles upwardly through rich absorption solution in the lower part thereof and flows from the upper end through a conduit 51, an air cooled rectifier 52, conduit 53, and a liquid cooled rectifier 54 to the first loop 55 of the air cooled condenser 56. Liquid ammonia formed by condensation in this first loop of the condenser drains into the liquid jacket of the rectifier 54 from which the liquid is delivered by overflow through conduit 57 to the lower part of the evaporator 46. Uncondensed ammonia vapor flows from the upper part of the rectifier 54 through conduit 58 to the second section 59 of the condenser 56. From this condenser section, liquid ammonia flows through conduit 60 into the upper part of the evaporator 46. From conduit 60 to the absorber 38 there is connected the usual vent conduit 61 in which is connected a so-called pressure vessel 62. The function of the latter is to store a variable quantity of excess hydrogen in order that the total pressure in the system may vary with the cooling air temperature as explained in the above mentioned application of Thomas.

In the evaporator 46, the liquid ammonia evaporates and diffuses into hydrogen which enters the lower part of the evaporator through conduit 47. The resulting gas mixture or strong gas flows from the upper end of the evaporator 46 through conduit 48, the inner passage 63 of the gas heat exchanger 43, and the conduit 45 to the absorber 38. Weak absorption solution flows from the generator 30 through conduit 64, the liquid heat exchanger 65, and conduit 66 to the upper part of the absorber 38. In the latter, the weak solution absorbs ammonia out of the gas mixture. The resulting weak gas returns to the evaporator 46 through conduit 44, the outer passage of the gas heat exchanger 43, and conduit 47. The enriched absorption solution flows from the lower part of the absorber 38 through conduit 67, the liquid heat exchanger 65, and conduit 68 to the analyzer 49. From the latter, the solution flows through conduit 69 into the strong liquid chamber 31 of the generator from where it is raised through the thermosyphon 35 into the upper end of the standpipe 34 in a manner well known in the art.

From the lower part of the evaporator 46, unevaporated liquid flows through a conduit 70, usually referred to as an evaporator drain, into the inner passage 63 of the gas heat exchanger 43. The liquid flowing downwardly over the baffles in passage 63 of the gas heat exchanger, cools the weak gas flowing upwardly in the outer passage of the gas heat exchanger by evaporation and diffusion into the strong gas descending through the inner passage 63. The lower end of passage 63, indicated as conduit 45, is formed with a downward loop, from the lower part of which a conduit 71 is connected to the lower part of the analyzer vessel 49. Liquid descending through the gas heat exchanger passage 63 drains through conduit 71 into the analyzer vessel 49, whereby the liquid is conducted independently of the absorber into contact with the generator vapors.

It will be understood that the liquid may be admitted into the generator or analyzer above a series of baffle plates in contact with the generator vapors or in any other manner so that the liquid and generator vapors are brought into thermal exchange relation for rectification of the vapors, or brought into contact for analyzation of the vapors. The return conduit for unevaporated liquid, such as conduit 29 in Fig. 1 and conduit 71 in Fig. 2, is formed with a downward loop or liquid trap to prevent passage of hot vapors from the generator into the auxiliary gas circuit.

Various other changes and modifications will be apparent to one skilled in the art, wherefore this invention is not limited to that which is illustrated in the drawings or described in the specification but only as indicated in the following claims.

What we claim is:

1. In an absorption refrigeration system, a generator, an evaporator, an absorber, means including a gas heat exchanger interconnecting said absorber and evaporator for circulation of inert gas therebetween, means including a liquid heat exchanger interconnecting said absorber and said generator for circulation of absorption liquid therebetween and means also including said gas heat exchanger and exclusive of said absorber and liquid heat exchanger for conducting unevaporated liquid from said evaporator to said generator.

2. In an absorption refrigeration system, a generator, an evaporator, an absorber, means including a gas heat exchanger interconnecting said absorber and evaporator for circulation of inert gas therebetween, means including a liquid heat exchanger and an analyzer interconnecting said absorber and said generator for circulation of absorption liquid therebetween and means also including said gas heat exchanger and said analyzer and exclusive of said absorber and said liquid heat exchanger for conducting unevaporated liquid from said evaporator into contact with vapors expelled from solution in said generator.

3. Refrigeration apparatus including a generator, an analyzer, a condenser, an evaporator, an absorber, said evaporator being located at a level above said absorber, means including a gas heat exchanger interconnecting said evaporator and absorber for circulation of inert gas therebetween, said gas heat exchanger being constructed and arranged to maintain substantially vertical columns of gas, one of said columns being in the downward path of flow from said evaporator to said absorber and the other column being in the upward path of flow from said absorber to said evaporator, means for circulating absorption liquid between said generator and absorber and including said analyzer in the path of liquid flow from said absorber to said generator, means also including said analyzer for conducting refrigerant vapor expelled from said absorption liquid in said generator to said condenser, means for conducting liquefied refrigerant from said condenser to said evaporator, and means exclusive of said absorber for conducting unevaporated refrigerant from said evaporator to said analyzer.

4. Refrigeration apparatus including a generator, an analyzer, a condenser, an evaporator, an absorber, said evaporator being located at a level above said absorber, means including a gas heat exchanger interconnecting said evaporator and absorber for circulation of inert gas therebetween, said gas heat exchanger being constructed and arranged to maintain substantially vertical columns of gas, one of said columns being in the downward path of flow from said evaporator to said absorber and the other column being in the upward path of flow from said absorber to said evaporator, means for circulating absorption liquid between said generator and absorber and including said analyzer in the path of liquid flow from said absorber to said generator, means also including said analyzer for conducting refrigerant vapor expelled from said absorption liquid in said generator to said condenser, means for conducting liquefied refrigerant from said condenser to said evaporator, and means including said gas heat exchanger but exclusive of said absorber for conducting unevaporated refrigerant from said evaporator to said analyzer.

5. Refrigeration apparatus including a generator, an analyzer, a condenser, an evaporator, an absorber, said evaporator being located at a level above said absorber, means including a gas heat exchanger interconnecting said evaporator and absorber for circulation of inert gas therebetween, said gas heat exchanger being constructed and arranged to maintain substantially vertical columns of gas, one of said columns being in the downward path of flow from said evaporator to said absorber and the other column being in the upward path of flow from said absorber to said evaporator, means for circulating absorption liquid between said generator and absorber and including said analyzer in the path of liquid flow from said absorber to said generator, means also including said analyzer for conducting refrigerant vapor expelled from said absorption liquid in said generator to said condenser, means for conducting liquefied refrigerant from said condenser to said evaporator, and means including said downward flow portion of the gas heat exchanger but exclusive of said absorber for conducting unevaporated refrigerant from said evaporator to said analyzer.

6. Refrigeration apparatus including a generator, an analyzer, a condenser, an evaporator, an absorber, said evaporator being located at a level above said absorber, means including a gas heat exchanger interconnecting said evaporator and absorber for circulation of inert gas therebetween, said gas heat exchanger being constructed and arranged to maintain substantially vertical columns of gas, one of said columns being in the downward path of flow from said evaporator to said absorber and the other column being in the upward path of flow from said absorber to said evaporator, means for circulating absorption liquid between said generator and absorber and including said analyzer in the path of liquid flow from said absorber to said generator, means also including said analyzer for conducting refrigerant vapor expelled from said absorption liquid in said generator to said condenser, means for conducting liquefied refrigerant from said condenser to said evaporator, a conduit for conducting unevaporated refrigerant from said evaporator into the upper part of said downward flow portion of said gas heat exchanger, and a conduit for liquid from the lower part of said downward flow portion to said analyzer, whereby unevaporated liquid flows from said evaporator to said analyzer through said gas heat exchanger but not through said absorber.

7. Refrigeration apparatus including a generator, a condenser, an evaporator, an absorber, means including a gas heat exchanger interconnecting said evaporator and absorber for circulation of inert gas therebetween, means for circulating absorption liquid between said generator and absorber and including an analyzer constructed and arranged to maintain a column of absorption liquid in the path of liquid flow from said absorber to said generator, means for conducting refrigerant vapor from said generator through the liquid column in said analyzer to said condenser, means for conducting liquefied refrigerant from said condenser to said evaporator, and means including said gas heat exchanger but exclusive of said absorber for conducting unevaporated refrigerant from said evaporator to said analyzer.

WILHELM GEORG KÖGEL.
NILS WIDELL.